United States Patent [19]

Ozawa et al.

[11] Patent Number: 4,644,157

[45] Date of Patent: Feb. 17, 1987

[54] OPTICAL ROTATION DETECTING APPARATUS

[75] Inventors: Kuniichi Ozawa, Hirakata; Yasuhiro Goto, Kadoma; Hiromi Nakase, Nara; Shinya Yukino, Katano, all of Japan

[73] Assignee: Matsushita Electric Industrial Co., Ltd., Osaka, Japan

[21] Appl. No.: 471,708

[22] Filed: Mar. 3, 1983

[30] Foreign Application Priority Data

Mar. 8, 1982 [JP] Japan .................................. 57-36042
May 21, 1982 [JP] Japan .................................. 57-86742
Jul. 15, 1982 [JP] Japan .................................. 57-123808

[51] Int. Cl.$^4$ ............................................. G01D 5/34
[52] U.S. Cl. ........................... 250/231 SE; 340/347 P
[58] Field of Search ................ 250/231 SE, 237 G; 340/347 P; 318/313, 463, 464, 480, 254, 254 A

[56] References Cited

U.S. PATENT DOCUMENTS

| | | | |
|---|---|---|---|
| 3,757,128 | 9/1973 | Vermeulen | 250/231 SE |
| 4,024,446 | 5/1977 | Burnett | 318/313 |
| 4,079,252 | 3/1978 | Brake | 250/237 G |
| 4,421,980 | 12/1983 | Kühne | 250/231 SE |
| 4,477,189 | 10/1984 | Ernst | 250/237 G |

Primary Examiner—David C. Nelms
Assistant Examiner—William L. Oen
Attorney, Agent, or Firm—Stevens, Davis, Miller & Mosher

[57] ABSTRACT

An optical rotation detecting apparatus for a bushless dc motor detects rotation information of the shaft by the slits arranged at equal pitches along the circumference of a rotary disk and a photoelectric conversion element arranged circumferentially at a pitch which is an integral multiple of the slit pitch and including a first set of photoelectric conversion element pieces arranged alternately with the former thereby generating a first rotation information signal having a frequency proportional to the rotational speed of the shaft and a second rotation information signal having a 90-degree phase difference with the first rotation information signal. The phases of the first and second rotation information signals are compared to detect the direction of rotation of the shaft. The accuracy of rotation information can be further improved by increasing the number of photoelectric conversion element pieces per slit pitch. The photoelectric conversion element includes an amorphous silicon photoelectric conversion element.

8 Claims, 29 Drawing Figures

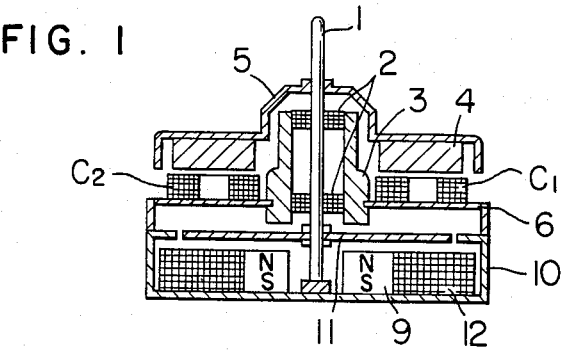
FIG. 1
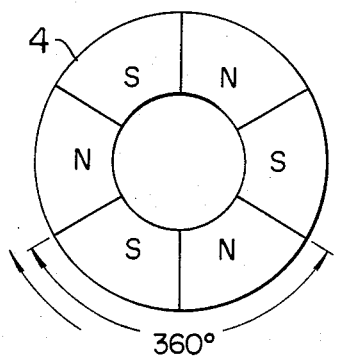
FIG. 2
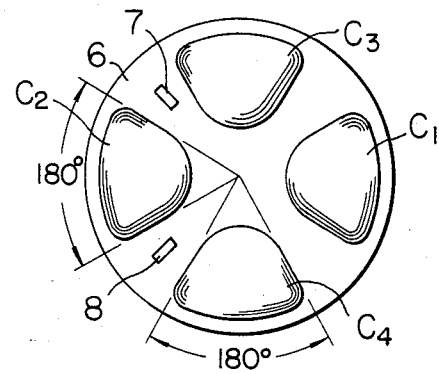
FIG. 3
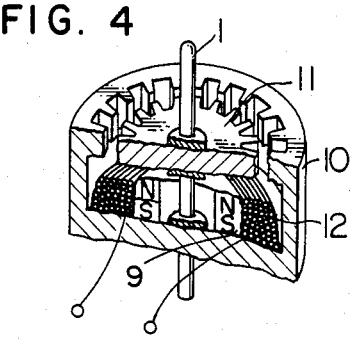
FIG. 4
FIG. 5

(a)

(b)

(a)
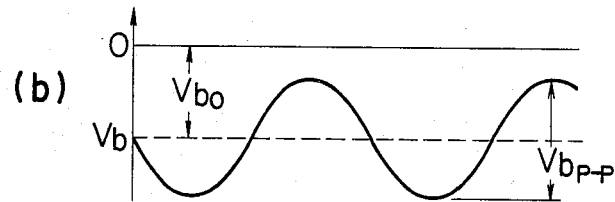
(b)
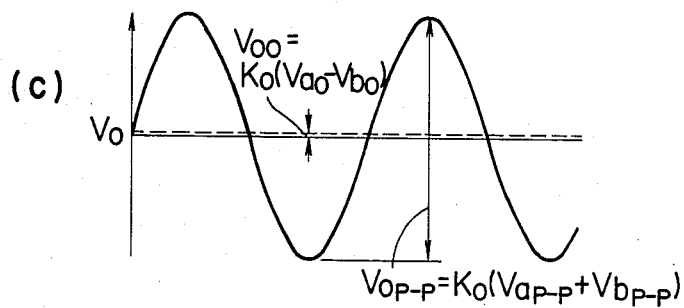
(c)

(ELECTRICAL ANGLE)
+ FORWARD ENERGIZATION
− REVERSE ENERGIZATION

OPTICAL ROTATION DETECTING APPARATUS

The present invention relates to an optical rotation detecting apparatus which is small in size and highly accurate, and more particularly to a rotation detecting apparatus well suited for use with electronic commutator motors, particularly brushless dc motors.

Recently, high-efficiency and high-reliability brushless motors have come in frequent use as motors for audio and video equipment.

These brushless dc motors are designed so that the rotor is a rotor magnet magnetized to have a number of pairs of magnetic poles and the stator includes a plurality of stator coils.

This type of known brushless dc motor is usually provided with a rotation detecting device or frequency generator (hereinafter simply referred to as an F.G) for detecting rotational information, e.g, rotational speed or rotational phase and a rotor position detecting device for performing an electronic commutator action to control the energization of the stator coils in accordance with the rotational position of the rotor magnet so as to allow the effective generation of a torque by the motor, and conventionally these detecting devices are of the magnetic type.

A known type of brushless dc motor having a rotor position detecting device will now be described with reference to FIGS. 1 to 4.

In FIG. 1 illustrating a longitudinal section of the brushless dc motor, numeral 1 designates a rotary shaft, 2 bearings mounted on the shaft 1, 3 a supporting member for the bearings 2, 4 a rotor magnet, and 5 a rotor yoke. The rotor magnet 4 is mounted on the rotor yoke 5 and the rotor yoke 5 is mounted on the rotary shaft 1 for rotation therewith.

The rotor magnet 4 includes a permanent magnet magnetized to have a plurality of magnetic poles and it is magnetized so that it has for example six poles as shown in FIG. 2 and the resulting magnetic field has a sinusoidal or trapezoidal waveform.

The stator coils are arranged on a stator coil base 6 and they include, as shown in FIG. 3, a first stator coil including coil blocks $C_1$ and $C_2$ of conductors connected in series and arranged in positions which are relatively integral multiples of 180° in terms of electrical angle with respect to the magnetic field from the rotor magnet 4 and a second stator coil similarly including coil blocks $C_3$ and $C_4$ of conductors connected in series and arranged in positions which are relatively integral multiples of 180° in electrical angle with respect to the magnetic field from the rotor magnet 4.

The first and second stator coils are arranged so that they face the rotor magnet 4 in positions which are displaced by an odd multiple of 90° in electrical angle from each other. Each of the coil blocks $C_1$, $C_2$, $C_3$ and $C_4$ has a width of 180° in electrical angle.

The term electrical angle is defined so that the angle for one cycle of the magnetized north pole and south pole of the rotor magnet 4 is equivalent to 360° as shown in FIG. 2 and thus the angle of the whole circumference of the 6-pole rotor magnet 4 shown in FIG. 2 (360° in terms of the mechanical angle) has the following value in terms of electrical angle.

$$360° \times (6 \text{ poles}/2) = 1080°$$

Also disposed on the stator coil base 6 are Hall generators 7 and 8 forming a rotor position detecting device for detecting the positional relation between the first and second stator coils and the rotor magnet 4 and performing an electronic commutator action so as to control the energization of the stator coils and supply current at such positions which allow the motor to generators 7 and 8 generate the voltages corresponding to the magnetic field produced by the roror magnet 4 thereby detecting the rotational position of the later.

Also mounted in position below the stator coil base 6 is an all-round opposed magnetic FG including a permanent magnet 9 magnetized to have north poles and south poles in the axial direction, a stator yoke 10 having teeth formed on the internal periphery, a rotor gear 11 positioned inside the stator yoke 10, mounted on the rotary shaft 1 and formed with teeth on the outer periphery and an FG coil 12 wound on the outer periphery of the permanent magnet 9.

The stator yoke 10 and the rotor gear 11 are made from a magnetic material, are formed with the same number k (k is a positive integer) of teeth arranged to face each other and form a magnetic circuit with the permanent magnet 9. Thus, when the rotor gear 11 is rotated so that the tops of its teeth are positioned opposite to those of the stator yoke 10, the reluctance is decreased and the magnetic flux generated from the permanent magnet 9 tends to flow more easily. On the contrary, when the tops of the teeth are opposite to the roots of the teeth, the reluctance is increased and the magnetic flux tends to flow less easily. As a result, the amount of the flowing magnetic flux changes alternately and an ac voltage of a value proportional to the differentiated value of the amounts of the flux changes is induced across the ends of the FG coil 12. The frequency $f_{FG}$ of the ac voltage induced across the ends of the FG coil 12 is k times (k is the number of teeth) the rotational frequency of the rotary shaft 1 and the rotational speed is detected in accordance with the frequency $f_{FG}$.

Firstly, the following performances are required for the FG.

(1) The accuracy of detection is not easily affected by the processing and assembling.

(2) A high detection frequency can be obtained even at low rotational speeds.

(3) Not only a high output voltage can be generated but induction.

(4) The FG itself does not generate noise and produce any adverse effects on the other circuits.

(5) The FG itself does not cause any irregular rotation and vibrations.

(6) The reduction in size can be attained with a simple construction.

While the FG shown in FIG. 1 and 4 is of the all-round opposed type such that the detection accuracy is not easily affected by the processing and assembling operations and the detection with greater accuracy is ensured, due to the difficulty of machining and the reduced variation of the reluctance, the pitch of the teeth cannot be decreased and thus it is impossible to produce an FG which is small in size and capable of producing a high detection frequency. Also, in this type of magnetic FG, the voltage induced in the FG coil is proportional to the time derivative of the change of the magnetic flux passing through the FG coil, with the result that not only a high output voltage cannot be produced at low rotational speeds but also noise such as induction noise due to the leakage flux from the rotor magnet or the current flowing to the stator coils tends to be superimposed on the FG coil thereby deteriorating the S/N ratio of the detection signal and hence the detection accuracy. In the case of this magnetic FG, if the leakage flux produced externally to the motor is varied due to the effect of variation of the reluctance caused by the rotation of the FG rotor gear and if this magnetic FG is used for example with the capstan motor of a portable VTR in which the audio signal playback head is positioned near the capstan motor, the variation of the leakage flux affects the playback head and the S/N ratio of the reproduced signal is deteriorated thereby giving rise to undesired results. Also, the known type of all-round opposed magnetic FG such as shown in FIG. 1 and 4 is disadvantageous in that the magnetic attraction of the opposing teeth causes vibrations during the rotation of the motor and the rotation becomes unstable thus causing such troubles as the irregular rotation.

Referring to the rotor position detecting device, the previously mentioned known magnetic type of FIG. 3 having the Hall generators arranged on the stator coil base is disadvantageous in that since the Hall generators are mounted on the base by soldering while observing visually and since the Hall generators themselves are each encased in a molded plastic material, the positioning accuracy of the Hall generators within the molded packages is not ensured and it is impossible to improve on their mounting accuracy. This deteriorates the accuracy of position detection with the result that during the electronic commutation the energization timing of the stator coils becomes inaccurate causing the irregular rotation and hence undesired results.

In the case of the brushless dc motors, while the manner of supplying current to the stator coils differs depending on the driving method used and different methods using various waveforms such as a sinusoidal waveform, rectangular waveform, etc., have been proposed, usually the waveform of the current supplied to the stator coils is determined by the detection waveform of the rotor position detecting device and the desired effect can be attained by any rotor position detecting device of the type capable of generating any desired waveform. In the case of the device using the Hall generators shown in FIG. 3, however, there are disadvantages that its generated voltages are determined by the magnetic field generated by the rotor magnet and it is difficult to obtain a waveform of any desired shape thus making it impossible to arbitrarily change the current supplied to the stator coils and so on.

Then, in the case of the magnetic type shown in FIG. 3, there are disadvantages that the Hall generators must be mounted on the same base as the stator coils so that while no serious difficulties will be caused in the case of the two-phase four-coil type of FIG. 3, the Hall generators impede the arrangement of the stator coils in the case of a type which is greater in number of phases and coils, complicated in construction and requiring a reduction in size.

As described hereinabove, the prior art magnetic FG and rotor position detecting device have a number of disadvantages.

Also, an FG of the optical type such as shown in FIG. 5 has been proposed as a detecting mechanism for detecting the direction of rotation of a rotary object. The construction of the FG shown in FIG. 5 will be described briefly with reference to the circuit diagram shown in FIG. 6. A rotary encoder 13 mounted on a rotary shaft 1 includes n slits 13a. Also two photoelectric sensors 14 and 15 for sensing the slits 13a in the rotary encoder 13 are fixedly mounted and the positions of the photoelectric sensors 14 and 15 are adjusted in such a manner that the rotation of the rotary encoder 13 causes the photoelectric sensors 14 and 15 to generate two signals which are different in phase by 90°. The signal generated from the photoelectric sensor 14 is converted to a pulse waveform by a pulse waveform conversion circuit 16 and then applied as an input signal to the data input (hereinafter simply referred to as a D input) of a flip-flop 17 (hereinafter simple referred to as a D-FF). Also, the signal generated from the photoelectric sensor 15 is converted to a pulse waveform by a pulse waveform conversion circuit 18 and then is used as an input signal to the clock input (hereinafter referred to as a C input) of the D-FF 17 and a rotational speed detection signal 19. The pulse waveforms applied to the D input and C input of the D-FF 17 are 90 degrees out of phase with each other and the Q output of the D-FF 17 is used as a rotational direction detection signal 20.

FIG. 7 shows the variations in the voltage of the rotational direction detection signal 20 due to the different rotational directions of the rotary encoder 13. Shown in (a) is the case where the rotary encoder 13 is rotated in a clockwise direction (hereinafter simply referred to as a CW). The D-FF 17 reads the D input voltage in response to the trailing edge of the pulse waveform at the C input and the voltage is delivered to the Q output. Since the pulse waveform applied to the C input has a phase lay of 90° with respect to that applied to the D input, at the time of the trailing edge of the pulse waveform to the C input the D input goes to a low level and thus the Q output goes to the low level. Shown in (b) is the case where the rotary encoder 13 is rotated in a counterclockwise direction (hereinafter referred to a CCW). Contrary to the case of (a), the pulse waveform applied to the C input has a phase lead of 90° with respect to that applied to the D input so that at the time of the trailing edge of the pulse waveform to the C input the D input goes to a high level and thus the Q output goes to the high level. As a result, the direction of rotation of the rotary encoder 13 can be detected in accordance with the votage of the rotational direction detection signal 20.

However, the detection of the direction of rotation according to this method requires that the signals applied to the D input and C input of the D-FF 17 are 90 degrees out of phase with each other and thus the problem with this method is the accuracy of position adjustment of the photoelectric sensors 14 and 15. Namely, the position adjustment of the photoelectric sensors 14 and 15 becomes extremely difficult as the number of the slits 13a of the rotary encoder 13 increases or the rotational speed of the rotary encoder 13 is increased. Moreover, if the accuracy of eccentricity and inclination in mounting the rotary encoder 13 on the rotary shaft 1 or the accuracy of the slit width is deteriorated, there is the danger of the pulse waveform to the D input or the C input of the D-FF 17 being distorted thus causing the voltage of the rotational direction detection signal 20 to become improper. As described hereinabove, the known optical FG has the disadvantage of requiring an improvement on the accuracy of mechanism and the accuracy of assembling for effecting the discrimination of the direction of rotation.

It is therefore the primary object of the present invention to provide an optical rotation detecting apparatus suited for use with an electronic commutator motor and including an FG which is small in size and high in power and capable of generating a rotational speed detection signal having a high detection frequency and improved S/N ratio and detecting the direction of rotation of a rotary object and a rotor rotational position detecting unit which is capable of generating any desired detection waveform and presenting no obstruction to the arrangement of the stator coils in the electronic commutator motor.

The present invention will be apparent from the following detailed description taken in conjunction with the accompanying drawings, in which:

FIG. 1 is a longitudinal sectional view of a motor with a known type of rotation detecting means.

FIG. 2 is a schematic plan view of the rotor magnet in the motor of FIG. 1.

FIG. 3 is a plan view of the stator coil base and the stator coils in the motor of FIG. 1.

FIG. 4 is a sectional perspective view showing the stator yoke and the rotor gear of the motor of FIG. 1.

FIG. 5 is a schematic diagram showing the basic component elements of a prior art optical rotation detecting device.

An embodiment of an optical rotation detecting apparatus according to the invention which is applied to a brushless dc motor will now be described with reference to FIGS. 8 to 18.

Figure 6:
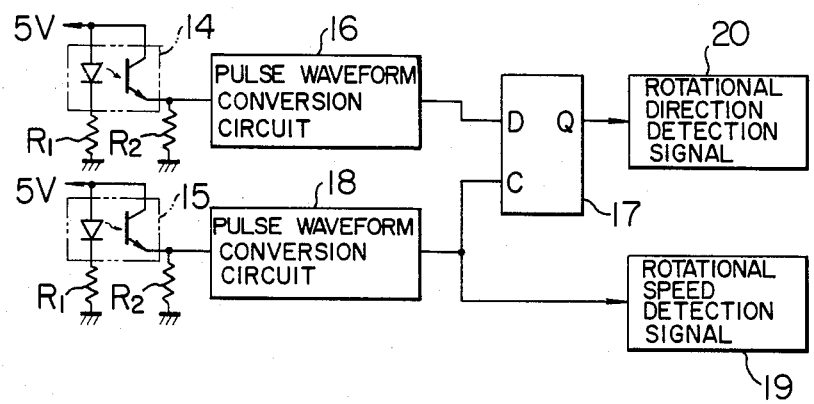
FIG. 6 is a block diagram showing an example of a rotational direction and speed detection signal circuit for a case employing the optical rotation detecting device of FIG. 5.
Figure 7:
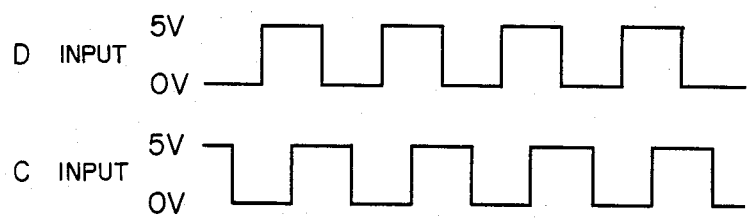
FIGS. 7a and 7b shows a plurality of waveforms useful for explaining the operation of the circuit of FIG. 6.
Figure 7:
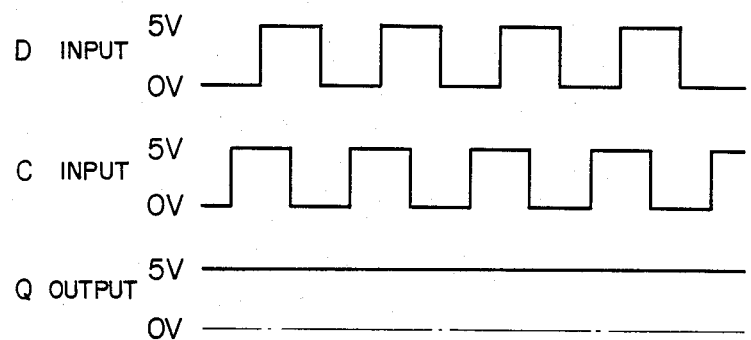
Figure 8:
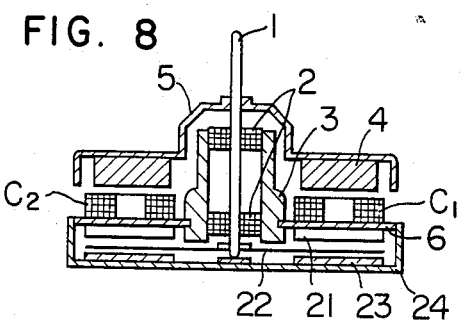
FIG. 8 is a longitudinal sectional view of a motor incorporating an embodiment of an optical rotation detecting apparatus according to the invention.

FIG. 8 is a longitudinal sectional view showing an embodiment of a brushless dc motor incorporating the optical rotation detecting apparatus according to the invention in which, as in FIG. 1, numeral 1 designates a rotary shaft, 2 bearings, 3 a supporting member for the bearings 2, 4 a rotor magnet, 5 a rotor yoke, and 6 a stator coil base. The rotor magnet 4 employes a permanent magnet having six magnet poles as in the case of FIG. 2. Also, coil blocks $C_1$, $C_2$, $C_3$ and $C_4$ are mounted on the stator coil base 6 as in the case of FIG. 3 thereby forming a first stator coil including the coil blocks $C_1$ and $C_2$ connected in series and a second stator coil including the coil blocks $C_3$ and $C_4$ connected in series, and this construction differs from that of FIG. 3 in that the Hall generators 7 and 8 are not mounted.

The construction of FIG. 8 which has been described so far is the same with that of FIG. 1 except that the Hall generators 7 and 8 are not mounted on the stator coil base.

Also, in FIG. 8 the optical rotation detecting apparatus according to the embodiment of the invention is mounted in position below the stator coil base 6.

This optical rotation detecting apparatus includes a planar light source 21, a rotary disk 22 and planar photoelectric conversion means 23. The planar light source 21 is fixedly mounted on the stator coil base 6 and the planar photoelectric conversion means 23 is fixed in position by a supporting member 24. The rotary disk 22 is mounted on the rotary shaft 1 for rotation therewith.

Figure 9:
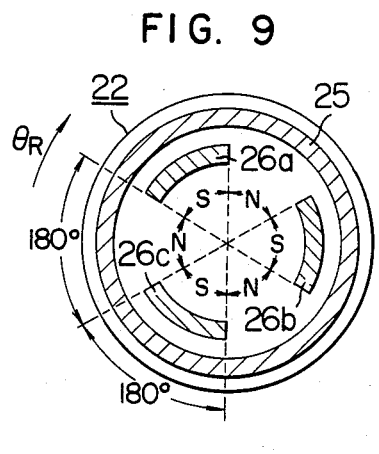
FIG. 9 is a plan view of the rotary disk in the motor of FIG. 8.
Figure 11:
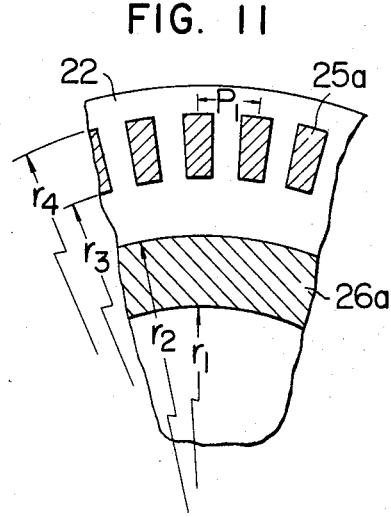
FIG. 11 is a partial enlarged view of the rotary disk in the motor of FIG. 8.
Figure 12:
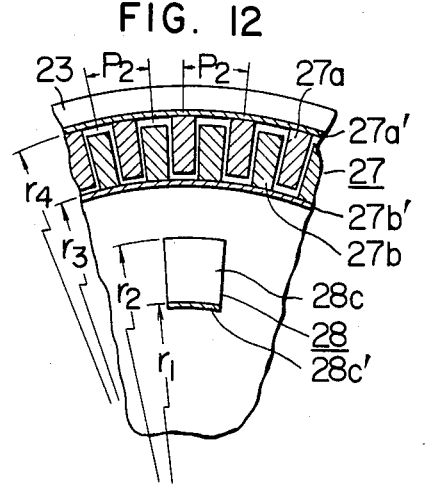
FIG. 12 is a partial enlarged view of the planar photoelectric conversion means in the motor of FIG. 8.

The rotary disk 22 is formed with a first slit group 25 arranged along the same circumference as shown by the hatching on the outer periphery in FIG. 9 to realize an all-round opposed FG by optical means and second slits 26a, 26b and 26c shown by the hatching on the inner side of the first slit group 25 for the purpose of rotor position detection by optical means. As shown in FIG. 11 (FIG. 11 shows a part of FIG. 9 in enlarged form), the first slit group 25 includes n small slits 25a arranged along the whole circumference at equal spaces within the radius extent between radii $r_3$ and $r_4$. The second slits 26a, 26b and 26c are each formed in the portion of 180° electrical angle corresponding to each south pole of the rotor magnet 4 and their number is the same with the number of the south poles or one half the number of the total poles. Namely, the three second slits 26a, 26b and 26c are provided since the number of the poles is 6 in the case of FIG. 9. It is assumed that in FIGS. 9 and 11 the light is transmitted through the portions of the slits 25a, 26a, 26b and 26c. The rotary disk 22 is made by for example depositing a metal film on a glass disk by evaporation and then photoetching the disk. Alternatively, the rotary disk 22 may be provided by forming slits in a thin disk of stainless by photoetching. The planar photoelectric conversion means 23 includes a first photoelectric conversion element 27 shown by the hatching on the outer periphery of FIG. 10 for realizing the all-round opposed FG by optical means and second photoelectric conversion elements 28 and 29 which are arranged on the inner side of the element 27 for the purpose of rotor position detection by optical means. As shown in FIG. 12 (FIG. 12 shows a part of FIG. 10 in enlarged form), the first photoelectric conversion element 27 includes n photoelectric conversion element pieces A27a arranged along the whole circumference at equal spaces and connnected to an electrode A27a' within the radius extent between the radii r₃ and r₄ and n photoelectric conversion element pieces B27b arranged alternate with the pieces A27a along the whole circumference at equal spaces and connected to an electrode B27b'. The photoelectric conversion element pieces A27a and B27b shown in FIG. 12 have a pitch P₂ which is equal to the pitch P₁ of the first slits 25a of the rotary disk 22 shown in FIG. 11, and also the photoelectric conversion element pieces A27a are electrically separated from the photoelectric conversion element pieces B27b so as to separately generate photoelectric currents proportional to the incident light quantities from the electrodes A27a' and B27b'.

In FIG. 8, the planar light source 21 projects the light downward in the Figure onto the circumferential portion defined by the radii r₁ to r₄ and formed with the slits.

Figure 13A:
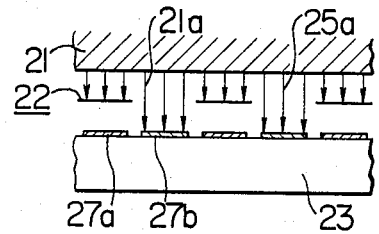
FIGS. 13a and 13b are diagrams useful for explaining the operation of the first photoelectric conversion element in the motor of FIG. 8.
Figure 13B:
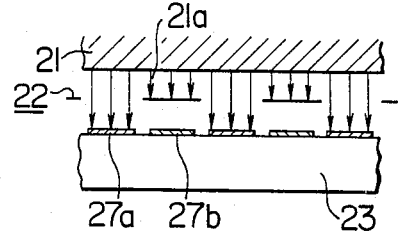
Figure 14:
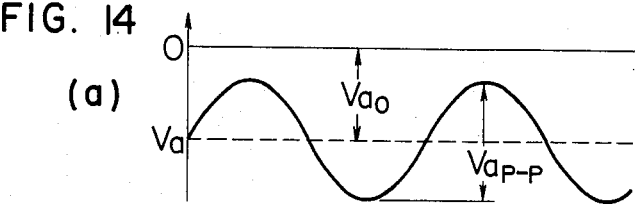
FIG. 14 shows a plurality of waveforms useful for explaining the operation of the first photoelectric conversion element in the motor of FIG. 8.
Figure 15:
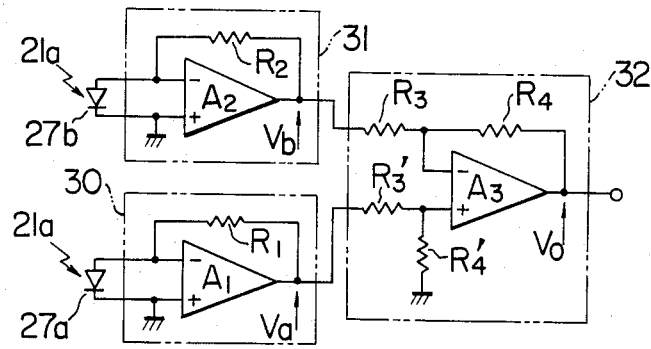
FIG. 15 is a circuit diagram of a detection circuit for the first photoelectric conversion elements in the motor of FIG. 8.

As a result, the light emitted from the planar light source 21 is intercepted by the rotary disk 22 and it is also projected onto the first photoelectric conversion element 27 through the first slits 25a of the rotary disk 22. Since the rotary disk 22 is rotated along with the rotary shaft 1, as shown in FIGS. 13a and 13b, the rotation of the rotary disk 22 every pitch P₁ of the first slits 25a produces alternately the condition of FIG. 13a where the photoelectric conversion element pieces B27b of the first photoelectric conversion element 27 are illuminated and the other photoelectric conversion element pieces A27a are not illuminated and the condition of FIG. 13b where the photoelectric conversion element pieces A27a are illuminated and the photoelectric conversion element pieces B27b are not illuminated. As a result, when the rotary disk 22 is rotated, the oppositely phased lights are projected onto the photoelectric conversion element pieces A27a and the photoelectric conversion element pieces B27b, respectively, and the resulting photoelectric currents are respectively applied to photoelectric current-voltage conversion circuits 30 and 31 formed by operational amplifiers A₁ and A₂ and resistors R₁ and R₂ as shown in FIG. 15, thereby generating a voltage $V_a$ proportional to the incident light quantity to the photoelectric conversion element pieces A27a and a voltage $V_b$ proportional to the incident light quantity to the photoelectric conversion element pieces B27b as shown in FIG. 14. Note that each of the photoelectric current-voltage conversion circuits shown in FIG. 15 is designed so that when the light is projected onto the photoelectric conversion element pieces thus generating an photoelectric current, a negative voltage proportional to the current is generated. The voltage $V_a$ and $V_b$ are opposite in phase and they have respectively dc values $V_{ao}$ and $V_{bo}$ and signal component voltages $V_{ap-p}$ and $V_{bp-p}$.

The voltages $V_a$ and $V_b$ are applied to a differential amplifier circuit 32 including an operational amplifier A₃ and resistors R₃, R₄, R₃' and R₄' ($R_3 : R_4 = R_3' : R_4'$) and having a gain $K_o$ ($K_o = R_4/R_3$) so that the difference between the two voltages is produced and the dc value $V_{oo}$ shown in FIG. 14 is cancelled and decreased $$V_{oop} = K_o (V_{ao} - V_{bo})$$

On the other hand, the signal component voltage $V_{op-p}$ becomes $$V_{op-p} = K_o (V_{ap-p} + V_{bp-p})$$

This an increase output voltage $V_o$ is generated.

This output voltage $V_o$ is used as a rotation information detection signal such as a speed detection signal or phase detection signal and a signal of high S/N ratio is generated due to the fact that the noise having the same phase and superposed on the voltage $V_a$ and $V_b$ are cancelled and reduced by obtaining the difference between the two and the signal is increased.

Figure 10:
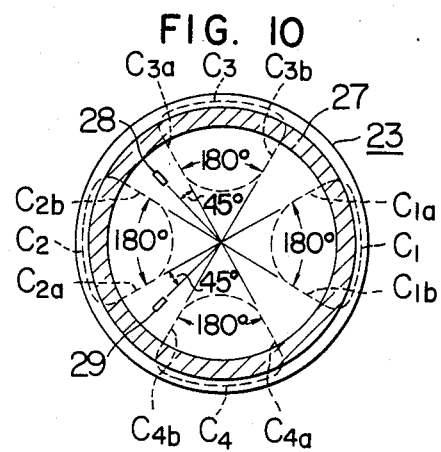
FIG. 10 is a plan view of the planar photoelectric conversion means in the motor of FIG. 8.

While, in FIG. 10, the coil blocks C₁ to C₄ are indicated by the broken lines, the coil blocks C₁, C₂, C₃ and C₄ are mounted on the stator coil base 6 and not on the planar photoelectric conversion means 23 and therefore they are indicated by the broken lines in the Figure so as to indicate their positional relation with the second photoelectric conversion elements 28 and 29.

As shown in FIG. 12, the second photoelectric conversion element 28 includes an electrode C28c' and a photoelectric conversion element piece C28c connected to the electrode C28c', and a photoelectric current proportional to the incident light quantity is generated from the electrode C28c'.

As a result, the light is projected from the planar light 21 onto the second photoelectric conversion element 28 through the second slit 26a, 26b or 26c of the rotary disk 22 when the second slit 26a, 26b or 26c is positioned over the second photoelectric conversion element 28, and the light is not projected onto the second photoelectric conversion element 28 when none of the second slits 26a, 26b and 26c is positioned above the second photoelectric conversion element 28. Thus, each combination of the condition where the light is projected onto the second photoelectric conversion element 28 and the condition where the light is not projected onto the element 28 is repeated three times for every rotation of the rotary disk 22.

Figure 16:
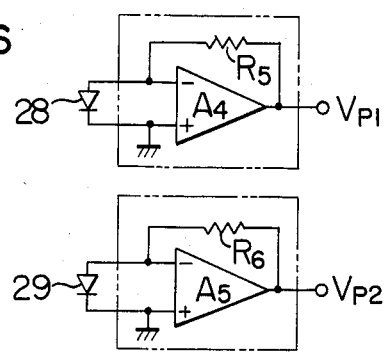
FIG. 16 is a circuit diagram of a detection circuit for the second photoelectric conversion elements in the motor of FIG. 8.

On the other hand, the other second photoelectric conversion element 29 is positioned apart from the second photoelectric conversion element by an integral multiple of 90° electrical angle (270° in FIG. 10) so that when the rotary disk 22 is rotated, the light projected onto the second photoelectric conversion element 29 is displaced by 90° electrical angle with that projected onto the second photoelectrical conversion element 28. Thus, as shown in FIG. 16, the second photoelectric conversion elements 28 and 29 are connected to photoelectric current-voltage conversion circuits which are similar to those of FIG. 15 and formed by operational amplifiers A₄ and A₅ and resistors R₅ and R₆ thereby generating rotor position detection signals which are out of phase by 90 degrees electrical angle as shown at $V_{P1}$ (the voltage obtained by converting the photoelectric current from the second photoelectric conversion element 28) and $V_{P2}$ (the voltage obtained by converting the photoelectric current from the second photoelectric conversion element 29) in FIG. 17.

Referring again to FIG. 10, numerals $C_{1a}$, $C_{1b}$, $C_{2a}$, $C_{2b}$, $C_{3a}$, $C_{3b}$, $C_{4a}$ and $C_{4b}$ indicate respectively the radially located conductor portions of the coil blocks C₁, C₂, C₃ and C₄ each consisting of a conductor and that which contributes to the generation of motor torque is the current flowing in the radially located conductor portions $C_{1a}$, $C_{1b}$, $C_{2a}$, $C_{2b}$, $C_{3a}$, $C_{3b}$, $C_{4a}$ and $C_{4b}$. The second photoelectric conversion elements 28 and 29 are displaced with respect to each other by an odd multiple of 90° electrical angle and they respectively lag the conductor portions $C_{3a}$ and $C_{2a}$ by 45° electrical angle.

As with the Hall generators in the prior art apparatus, the second photoelectric conversion elements 28 and 29 are provided to perform an electronic commutator action such that the positional relation between the stator coils and the rotor magnet 4 is detected and current is supplied to the coil blocks $C_1$, $C_2$, $C_3$ and $C_4$ at the maximum point of the magnetic flux of the rotor magnet 4 passing through the radially located conductor portions $C_{1a}$, $C_{1b}$, $C_{2a}$, $C_{2b}$, $C_{3a}$, $C_{3b}$, $C_{4a}$ and $C_{4b}$ of the coil blocks $C_1$, $C_2$, $C_3$ and $C_4$ thereby allowing the motor to produce its torque effectively. Thus, if $\phi_1$ represents the magnetic flux passing through the radially located conductor portions $C_{1a}$, $C_{1b}$, $C_{2a}$ and $C_{2b}$ of the coil blocks $C_1$ and $C_2$ forming the first stator coil and $\phi_2$ represents the magnetic flux passing through the radially located conductor portions $C_{3a}$, $C_{3b}$, $C_{4a}$ and $C_{4b}$ of the coil blocks $C_3$ and $C_4$ forming the second stator coil and if the position of the rotor magnet 4 relative to the stator coils in FIGS. 9 and 10 is 0°, then the flux linkages $\phi_1$ and $\phi_2$ at an rotational angle $\theta_R$ (a clockwise angle in terms of electrical angle) of the rotor magnet 4 take the form of alternating magnetic fields corresponding to the rotational angle $\theta_R$ such as $\phi_1$ and $\phi_2$ in FIG. 17.

In other words, with the first stator coil, when $\theta R = 0°$, the conductor portions $C_{1a}$, $C_{1b}$, $C_{2a}$ and $C_{2b}$ are near the boundaries of the south pole and north pole of the rotor magnet 4 and the magnetic flux $\phi_1$ becomes zero. The magnetic flux $\phi_1$ increases with increase in the rotational angle $\theta_R$ so that when $\theta_R = 90°$, the conductor portions $C_{1a}$, $C_{1b}$, $C_{2a}$ and $C_{2b}$ are positioned near the pole center of the south pole and north pole of the rotor magnet 4 and the magnetic flux $\phi_1$ attains the maximum value. When $\theta_R = 180°$, the conductor portions $C_{1a}$, $C_{1b}$, $C_{2a}$ and $C_{2b}$ are again positioned near the boundaries of the south pole and north pole of the rotor magnet 4 and the value of $\phi_1$ becomes zero. When $\theta_R > 180°$, the magnetic flux passing through the conductor portions $C_{1a}$, $C_{1b}$, $C_{2a}$ and $C_{2b}$ becomes opposite in polarity to that at $0° < \theta_R < 180°$. Assuming that this represents the negative direction, when $\theta_R = 270°$, the conductor portions $C_{1a}$, $C_{1b}$, $C_{2a}$ and $C_{2b}$ are positioned near the pole center of the south pole and north pole of the rotor magnet 4 and the value of $\phi_1$ assumes the maximum negative value, though it is opposite in polarity to that at $\theta_R = 90°$. If, for example, the rotor magnet 4 is magnetized to generate a sinusoidal waveform, the magnetic flux $\phi_1$ varies like a sinusoidal waveform with $\theta_R = 0°$ to 360° forming one cycle as shown at $\phi_1$ in FIG. 17.

Figure 17:
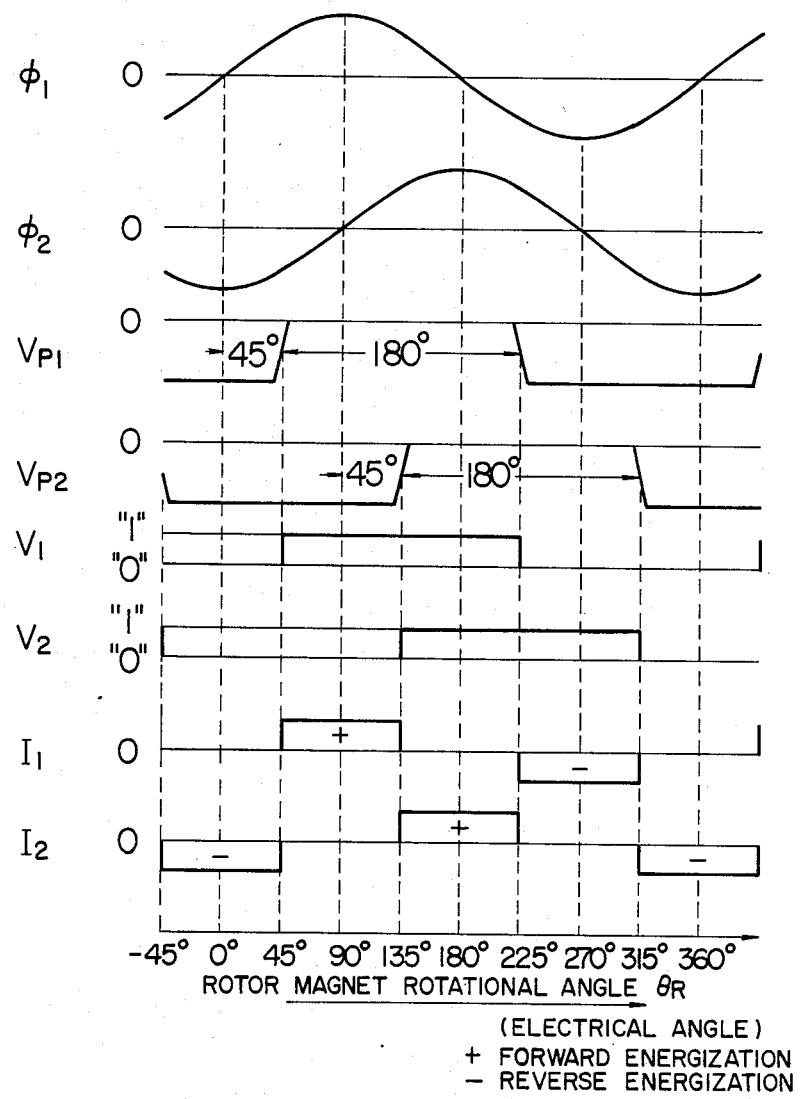
FIG. 17 shows a plurality of waveforms useful for explaining the operation of the second photoelectric conversion elements in the motor of FIG. 8.
Figure 18A:
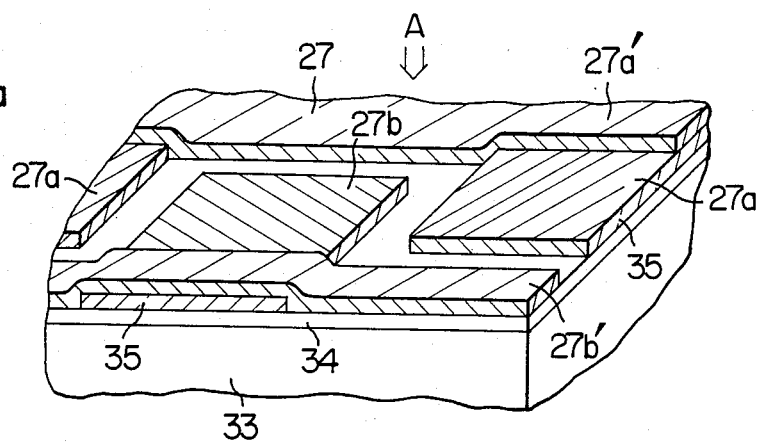
FIGS. 18a, 18b, 18c and 18d shows a perspective view, plan view, side view and equivalent circuit diagram for an embodiment of a planar photoelectric conversion element according to the invention.
Figure 18B:
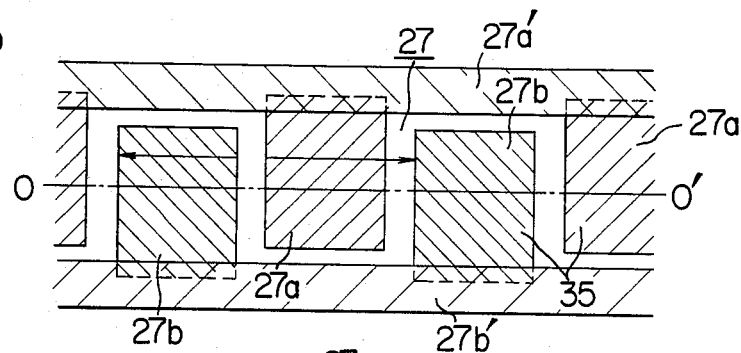
Figure 18C:
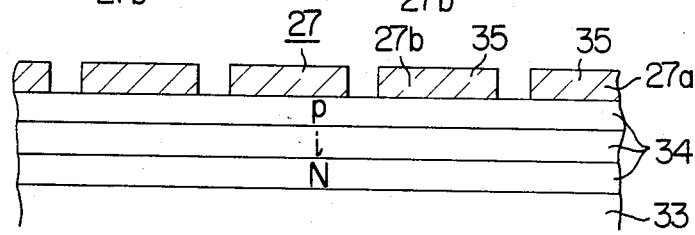
Figure 18D:
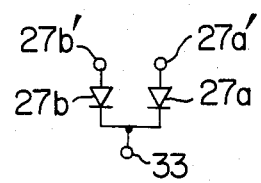

Similarly, the coil blocks $C_3$ and $C_4$ forming the second stator coil are positioned so as to be displaced with respect to the first stator coil by 90° electrical angle and thus the waveform of the magnetic flux $\phi_2$ becomes as shown at $\phi_2$ in FIG. 17 which is displaced by 90° with respect to $\phi_1$.

Since the second photoelectric conversion elements 28 and 29 are each displaced with respect to the stator coil by 45° electrical angle as mentioned previously, the conversion of their output currents to voltages by the similar photoelectric current-voltage conversion circuits as shown in FIG. 15 and including the operational amplifiers $A_4$ and $A_5$ and the resistors $R_4$ and $R_5$ as shown in FIG. 16 results in output voltages $V_{P1}$ and $V_{P2}$ whose waveforms are displaced by 45° with respect to $\phi_1$ and $\phi_2$, respectively, as shown at $V_{P1}$ and $V_{P2}$ in FIG. 17.

The voltages $V_{P1}$ and $V_{P2}$ are each reshaped through a waveform reshaping circuit and the resulting signals $V_1$ and $V_2$ are applied to a logical circuit whose output signals are used to control a current $I_1$ for energizing the first stator coil and a current $I_2$ for energizing the second stator coil. Thus, as shown in FIG. 17, the current $I_1$ flows in the positive direction during the interval of 90° or $\theta_R = 45$ to 135° (the interval in which $V_1$ goes to "1" and $V_2$ goes to "0") during which the magnetic flux $\phi_1$ attains the maximum positive value, the current $I_2$ flows in the positive direction during the interval of 90° or $\theta_R = 135$ to 225° (the interval in which $V_1$ goes to "1" and $V_2$ goes to "1") during which the magnetic flux $\phi_2$ attains the maximum positive value, the current $I_1$ flows in the opposite direction during the interval of 90° or $\theta_R = 225$ to 315° (the interval in which $V_1$ goes to "0" and $V_2$ goes to "1") during which the magnetic flux $\phi_1$ attains the maximum negative value, and the current $I_2$ flows in the opposite direction during the interval of 90° or $\theta_R = 315°$ (or -45°) to 45° (the interval in which $V_1$ goes to "0" and $V_2$ goes to "0") during which the magnetic flux $\phi_2$ attains the maximum negative value, thereby effecting the energization control or electronic commutation action to cause the energization current to contribute effectively to the torque generation. Then, the thin planar photoelectric conversion elements can be realized by means of semiconductor photoelectric conversion elements and these photoelectric conversion elements are classified into those utilizing the photoconductive effect in which the resistance value of material varies with the light radiation and others utilizing the photovoltaic effect in which an electromotive force is generated by the radiation of light and a photovoltaic power supply is obtained.

With such optical rotation detecting apparatus as provided by the present invention, generally it is desired that the apparatus consumes less power and is small in size, and therefore a light source of very weak light such as a light-emitting diode is used for its light source.

Thus, it is desirable that the output of a photoelectric conversion element utilizing the photoelectric current-voltage conversion circuit of the type shown in FIG. 15 rather than using an output produced by the radiation of a very weak light and having a large current-to-dark current ratio as one produced by the photoconductive effect.

If this photoelectric current-voltage conversion circuit is used, the voltage between the ends of the photoelectric conversion element becomes substantially zero volts and approaches a short-circuit condition thereby reducing the generation of dark current and ensuring the generation of a stable detection signal even with a very weak light.

Now, while various photoelectric conversion elements including a monocrystal silicon photoelectric conversion element called as a photodiode, selenium photoelectric conversion element, amorphous silicon photoelectric conversion element (hereinafter simply referred to as an a-Si photoelectric conversion element), the photoelectric conversion element used with this invention must have the following properties.

(1) The photoelectric conversion element having a large area can be produced inexpensively.

(2) The precision processing is possible and a large number of the independent elements can be formed on the same base. Also, these elements can be connected and disconnected easily.

(3) The degree of sensitivity is high.

(4) The response is fast.

(5) The range of operating temperatures is wide.

(6) The variations in characteristics among the elements are small.

Firstly, while the monocrystal silicon photoelectric conversion element practically meets the above requirements (2) to (6), the increased area increases the cost.

On the other hand, while the large-area selenium photoelectric conversion element, CdS photoelectric conversion element, etc., can be produced at low costs, it is difficult to perform the precision processing by photoetching, etc. Thus, if, for example, the photoelectric conversion element pieces 27a and 27b shown in FIG. 12 are about 100 μm in width and the width of the separating spaces is on the order of zero to several tens μm, the photoelectric conversion elements of this invention cannot be realized with these photoelectric conversion elements. Also, the selenium photoelectric conversion element, etc., are low in sensitivity, as low as about one tenth in response and having very great variations in characteristics among the elements of the same type as compared with the a-Si photoelectric conversion element which will be described later and therefore these elements are not suited for use with the present invention excepting special cases.

On the other hand, the a-Si photoelectric conversion element of the large-area and thin planar type can be produced at a low cost, and the removal of unwanted portions of a transparent electrode by photoetching or the like as will be mentioned later can realize the precision processing which forms a large number of separate photoelectric conversion elements on the same base, thus making it possible to provide a photoelectric conversion element of the type shown in FIG. 12.

Also, this element has a high degree of sensitivity, is capable of generating a sufficient output signal even if the light source is composed of light-emitting diodes of very weak light and has a response characteristic of responding to about several tens kHz, thus meeting the response characteristic required by this invention.

Further, the range of operating temperatures is wide so that the above-mentioned sensitivity and response characteristic vary less in a wide range of from over 80° C. to less than −60° C. and the desired performances are ensured.

Further, the variations in characteristics are reduced not only among the elements formed on the same base but also among those formed on separate bases and the element is excellent in mass productivity.

From the foregoing description it will be seen that the a-Si photoelectric conversion element is best suited for the planar photoelectric conversion elements incorporated in the rotation detecting apparatus according to the invention.

The a-Si photoelectric conversion element will now be described briefly by way of an example.

FIG. 18 shows an example of the a-Si photoelectric conversion element suited for use with this invention, and shown in (a) of FIG. 18 is an enlarged cutaway view of a portion formed for example with the first photoelectric conversion element 27 shown in FIG. 12.

Also shown in (b) is a plan view (as looked from the direction of an arrow A in (a)) of the first photoelectric conversion element 27, and shown in (c) is a longitudinal sectional view taken along the dot-and-dash line 0-0' in (b).

In (a) of FIG. 18, a hydrogenated amorphous silicon film 34 having a P-i-N junction, for example, is formed on an opaque lower electrode 33 made from a stainless steel sheet and serving as a base and deposited on the a-Si:H film 34 are transparent electrodes 35 of indium tin oxide or ITO.

As shown in (b) and (c) of FIG. 18, the a-Si:H film 34 has a P-i-N junction formed between the lower electrode 33 and the IOT 35 and thus only those portions having the ITO 35 deposited thereon exhibit a photoelectric conversion characteristic and serve as a photoelectric conversion element. The other portions do not function as the photoelectric conversion element, increase the specific resistance of the a-Si:H film 34 and has a thickness of as small as several thousands Å. Thus, if the width of the portions with no ITO deposition is selected on the order of several μm to several tens μm, those portions are sufficiently long as compared with the film thickness and have a large transverse resistance value thereby serving as an electric insulator. Thus, if the ITO 35 is deposited in the form of separated islands as shown in (a), (b) and (c), it is possible to form separate photoelectric conversion element pieces 27a and 27b with the lower electrode 33 serving as the common electrode.

The method of depositing the ITO 35 in the form of separate islands may for example be consisting of coating the whole surface of the a-Si film 34 with the ITO 35 and removing the unwanted portions of the ITO 35 to form the desired separation spaces, and therefore the thus separated portions with the deposition of the ITO 35 not only serve as separate photoelectric conversion element pieces but also may be connected to electrodes A27a' and B27b' made of aluminum or the like as shown in (a), (b) and (c) of FIG. 18 or FIG. 12. Thus, any photoelectric conversion element requiring the precision processing as shown in FIG. 12 can be easily realized.

With the photoelectric conversion element shown in (a), (b) and (c) of FIG. 18, the lower electrode 33 serves as the common cathode electrode and also the electrodes A27a' and b27b' serve as the anodes separated from each other as shown in (d) of FIG. 18.

The above-described a-Si photoelectric conversion element usually has a peak wavelength sensitivity of about 5,700 Å and therefore a light source of about 5,700 Å should preferably be used for the light source. A light source having an emission wavelength of about 5,700 Å may for example be realized with light-emitting diodes serving as a visible light source, such as, an orange color light-emitting diodes (the emission wavelength is approximately 6,300 Å) or green color light-emitting diodes (the emission wavelength is approximately 6,600 Å).

An embodiment of the optical rotation detecting element according to the invention has been described so far and the present invention includes optical means providing an FG of the all-round or substantially all-round opposed type and rotor rotational position detecting means arranged in a radial position different from that of the FG and adapted to perform an electronic commutation action. Thus, the invention is not intended to be limited to brushless dc motors of the type shown in FIG. 8 and it can be applied to any motor irrespective of its type, driving system, etc., provided that it requires an FG and rotor rotational position detecting means.

Further, while, in the above-described embodiment, each of the current $I_1$ supplied to the first stator coil and the current $I_2$ supplied to the second stator coil has a rectangular waveform, in accordance with the invention the shape of the second slits 26a, 26b and 26c in the rotary disk 22, or the shape of the second photoelectric conversion elements 28 and 29 or both may be changed to generate any desired detection waveform. For instance, driving methods have been proposed in which the rotor magnet of a two-phase brushless dc motor is magnetized to generate a sine waveform to supply a current of sine waveform to the first stator coil and a current of cosine waveform having a 90-degree phase different with the sine waveform is supplied to the second stator coil displaced with respect to the first stator coil by 90° in electrical angle thereby reducing the torque ripple, and the present invention, due to its capacity to obtain any desired detection waveform, can also be applied to these driving methods to produce the desired effects.

Further, while, in the above-described embodiment, the first photoelectric conversion element is arranged along the whole circumference, the same degree of detection accuracy can be obtained by arranging the element substantially along the whole circumference rather than arranging it along the whole circumference and this is advantageous from the packaging point of view in that lead wires or the like may be brought out from those portions where the first photoelectric conversion element is not formed. Alternatively, a third photoelectric conversion element for a different purpose (i.e., one having a 90 degrees phase different with the first photoelectric conversion element 27 and adapted to discriminate the direction of rotation) may be formed on the portions where the first photoelectric conversion element is not formed.

Still further, while the a-Si photoelectric conversion element is best suited for the planar photoelectric conversion elements of this invention, other types of photoelectric conversion element and monocrystal silicon photoelectric conversion element can also be used for the photoelectric conversion elements of this invention. Also, not only the photoelectric conversion elements utilizing the photovoltaic effect but also the photoelectric conversion elements utilizing the photoconductive effect can be used for the photoelectric conversion elements of the present invention.

Further, while, in the embodiment of the invention, the pitch $P_2$ of the photoelectric conversion element pieces A27a and B27b forming the first photoelectric conversion element shown in FIG. 12 is the same with the slit pitch $P_1$ of the first slits 25a of the rotary disk 22 shown in FIG. 11 and two of the photoelectric conversion element pieces A27a or B27b are arranged in each slit pitch $P_1$, the present invention can also use a first photoelectric conversion element constructed such that two or more of the photoelectric conversion element pieces are arranged in each slit pitch $P_1$.

A specific embodiment of rotational direction discriminating means according to the invention will now be described.

Figure 19:
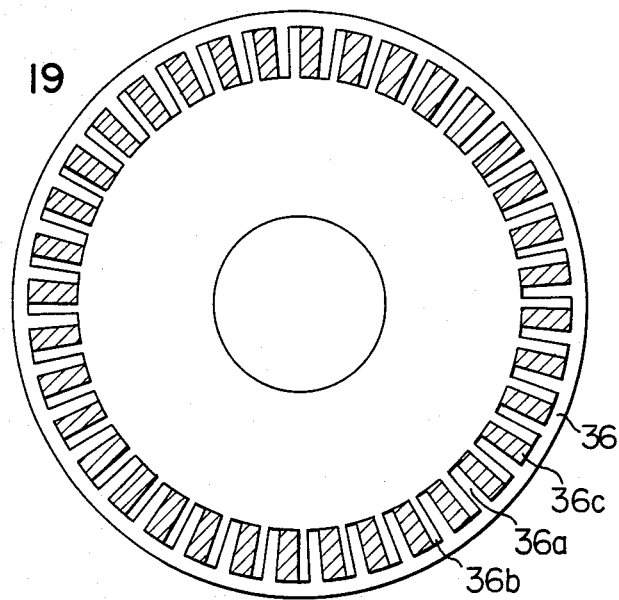
FIG. 19 is a plan view showing the pattern of a a rotational direction detecting planar photoelectric conversion element according to another embodiment of the invention.

To generate 90-degree phase difference signals for discriminating the direction of rotation, planar photoelectric conversion means 36 of the pattern shown in FIG. 19 and having a 90-degree phase difference is used in place of the planar photoelectric conversion means 23 of FIG. 8, for example.

Numeral 36a designates a first photoelectric conversion element including n projections arranged along the circumference to extend from the outer periphery toward the center and each having a width of about one fourth the slit pitch of the rotary disk 22, 36b a second photoelectric conversion element including n projections arranged along the circumference to extend from the center toward the outer periphery and each having a width of about one fourth the slit pitch of the rotary disk 22, and 36c portions interposed between the first and second photoelectric conversion elements 36a and 36b, each having a width of about one half the slit pitch of the rotary disk 22 and separated electrically from the first and second photoelectric conversion elements 36a and 36b.

Figure 20:
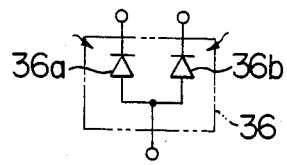
FIG. 20 is an equivalent circuit of the planar photoelectric conversion element used in FIG. 19.
Figure 21:
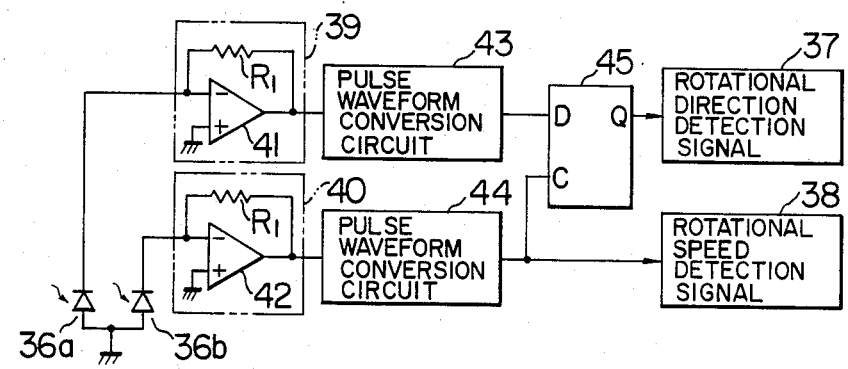
FIG. 21 is a block diagram for explaining the basic operation of a rotational direction and speed detection circuit which employs the planar photoelectric conversion element of FIG. 19.

If the 90-degree phase difference planar photoelectric conversion means 36 is constructed such that an equivalent circuit of the first and second photoelectric conversion elements 36a and 36b takes the form of a common anode circuit shown in FIG. 20, it is possible to generate a rotational direction detection signal 37 and a rotational speed detection signal 38 through the circuit shown in FIG. 21.

In this case, the equivalent circuit shown in FIG. 20 has a common anode construction which is different from the common cathode construction shown in (d) of FIG. 18. This is due to the fact that where the 90-degree phase difference planar photoelectric conversion means 36 is composed for example of a-Si photoelectric conversion means, the use of a-Si photoelectric conversion means having an ITO (35)/P-i-N (34)/base (33) construction as shown in (c) of FIG. 18 results in the common cathode construction and the use of a-Si photoelectric conversion means having an ITO (35)/N-i-P (34)/base (33) construction (not shown) results in the common anode construction. The same effect can be obtained by either of the constructions.

Referring now to FIG. 21, numerals 39 and 40 designate photoelectric current-voltage conversion circuits including operational amplifiers 41 and 42, respectively, and the output signals of the photoelectric current-voltage conversion circuits 39 and 40 are respectively converted to pulse waveforms by pulse waveform conversion circuits 43 and 44 and then applied to a D input and C input of a D-FF 45.

Figure 22:
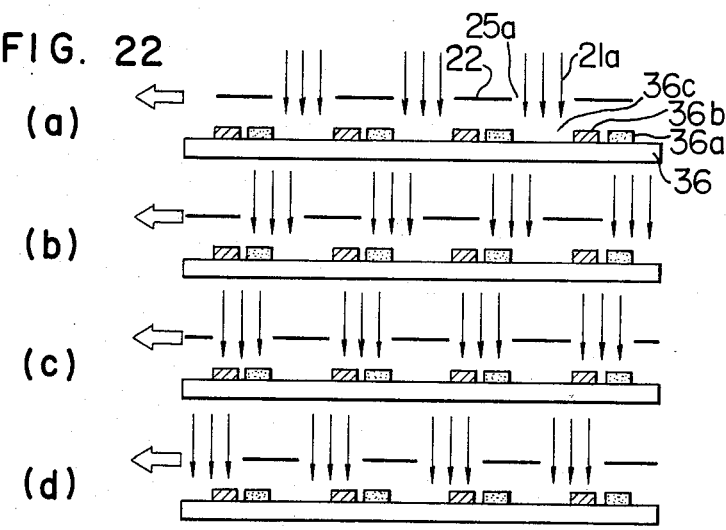
FIGS. 22 to 25 are waveform diagrams useful for explaining the operation of the rotational direction and speed detection circuit of FIG. 21.
Figure 23:
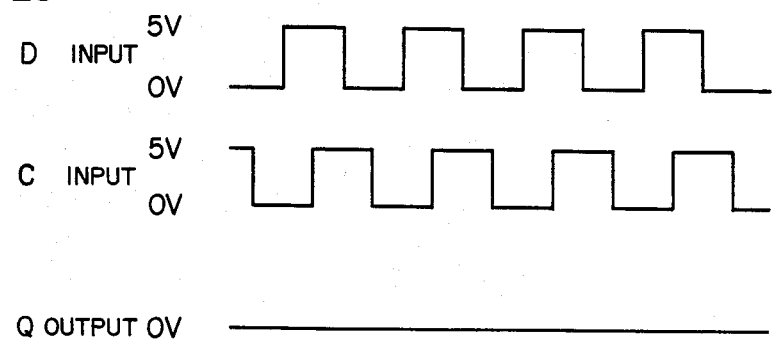
Figure 24:
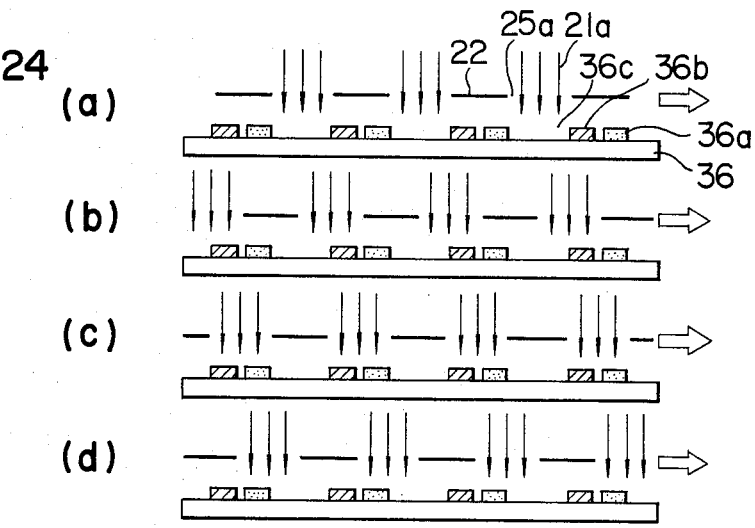
Figure 25:
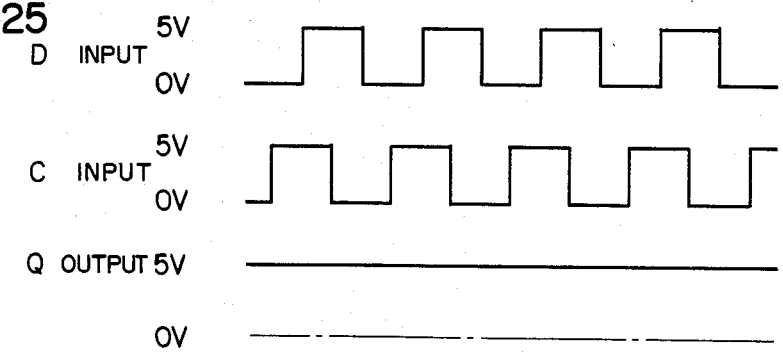

With the planar photoelectric conversion means 36 mounted in place of the planar photoelectric conversion means 23 shown in FIG. 8, the light 21a emitted from the planar light source 21 is projected onto the 90-degree phase difference planar photoelectric conversion means 36 through the n slits 25a of the rotary disk 22. Since the rotary disk 22 is rotated with the rotary shaft 1, the light 21a projected onto the 90-degree phase difference planar photoelectric conversion means 36 varies as shown in (a) to (d) of FIG. 22 and (a) to (d) of FIG. 24, respectively, depending on the direction of rotation of the rotary disk 22. When the light 21a projected onto the 90-degree phase difference planar photoelectric conversion means 36 varies as shown in (a) to (d) of FIG. 22, in the circuit of FIG. 21 the waveforms at the D input, C input and Q output of the D-FF 45 become as shown in FIG. 23 and the Q output goes to the low level. When the rotary disk 22 is rotated in the opposite direction to that of FIG. 22 so that the light 21a projected onto the 90-degree phase difference planar photoelectric conversion means 36 varies as shown in (a) to (d) of FIG. 24, in the circuit of FIG. 21 the waveforms at the D input, C input and Q output of the D-FF 45 become as shown in FIG. 25 and the Q output goes to the high level. In this way, the direction of rotation of the rotary disk 22 is detected in accordance with the voltage of the rotational direction detection signal 37.

As described hereinabove, in accordance with the present invention two signals which are out of phase by 90 degrees can be generated without the need for the position adjustment required in generating two signals which are out of phase by 90 degrees by using two photoelectric sensors as in the prior art apparatus. Also, by virtue of the fact that the light emitted from the planar light source is received by the whole circumference, as compared with the method in which the light emitted from one point is received at another point, some tolerance can be afforded for the eccentricity and inclination in mounting the rotary disk on the rotary shaft and the slit width accuracy and thus it is possible to effect the detection of the tape speed, the rotational speed of a rotary object or the like with a high degree of accuracy.

For instance, if it is desired to generate two different signals which are out of phase by 90 degrees with a higher degree of accuracy for rotational direction discriminating purposes, it is possible to use a first photoelectric conversion element including photoelectric conversion element pieces arranged along the whole circumference or substantially the whole circumference such that four photoelectric conversion element pieces are arranged at equal intervals in the width of the slit pitch $P_1$ of the rotary disk 22 and that with the angle of the pitch $P_1$ selected 360° the first photoelectric conversion element piece is arranged at a reference or zero-degree position and the second, third and fourth photoelectric conversion element pieces are displaced with respect to the first photoelectric conversion element piece by 90°, 180° and 270°, respectively (the fourth photoelectric conversion element piece is displaced with respect to the second photoelectric conversion element piece by 180°). The photoelectric current from each of these photoelectric conversion element pieces is converted to a voltage by a photoelectric current-voltage conversion circuit of the type shown in FIG. 15 thereby generating voltages $l_1$, $l_2$, $l_3$ and $l_4$ respectively corresponding to the photoelectric currents from the first, second, third and fourth photoelectric conversion element pieces and then the difference signals of these voltages $l_1$, $l_2$, $l_3$ and $l_4$ or a voltage $l_5 = l_1 - l_3$ and a voltage $l_6 = l_2 - l_4$ are generated. With the angle of the pitch $P_1$ selected 360°, the relationship between the voltages $l_5$ and $l_6$ is such that signals are generated which are out of phase by 90° and having a high S/N ratio due to the cancellation of the dc components and the in-phase noise.

The first photoelectric conversion element of this invention is not limited to the described types including two or more sets of photoelectric conversion element pieces and it is possible to use a first photoelectric conversion element including photoelectric conversion element pieces formed at the rate of one per slit pitch $P_1$ of the first slits in the rotary disk whereby the photoelectric current from the photoelectric conversion element pieces is converted to a voltage by a photoelectric current-voltage conversion circuit such as shown in FIG. 15 and a voltage is generated as shown at $V_a$ or $V_b$ in FIG. 14 thereby detecting the desired rotation information in accordance with the voltage.

Further, in accordance with the invention, in addition to the first and second photoelectric conversion elements, it is possible to include a third photoelectric conversion element in the planar photoelectric conversion means and a third slit in the rotary disk so as to generate an absolute phase detecting signal indicative of the voltage variation of one cycle per revolution of an electronic commutator motor.

From the foregoing description it will be seen that the present invention has the following effects.

(1) A rotation detecting apparatus of a reduced size is provided due to the formation on the same planar photoelectric conversion means of an FG photoelectric conversion element for rotation information detecting purposes and photoelectric conversion elements for rotor rotational position detecting purposes.

(2) An optical rotation detecting apparatus is provided in which the detection accuracy of an FG is not affected by the processing and assembling operations due to the fact that the rotation information detecting FG is formed along the whole circumference or substantially the whole circumference so that a signal is generated which is integrated over the whole circumference and the mechanical inaccuracy is integrated by the whole circumference.

(3) Since the rotation information detecting FG includes a light source, first slits in a rotary disk and a first photoelectric conversion element on the planar photoelectric conversion means and since their pitches can be reduced, a high detection frequency can be obtained even at low rotational speeds.

(4) Since the rotation information detecting FG is composed of optical means, the output signal of the FG is not varied with the rotational speed so that a high output voltage is generated even at low rotational speeds and it is not easily affected by external noise.

(5) Since the detection is accomplished by optical means, no noise is generated externally and also no irregular rotation and vibrations are caused.

(6) Since the rotor position detecting means serving the electronic commutation function includes the light source, second slits in the rotary disk and second photoelectric conversion elements on the planar photoelectric conversion means, any desired detection waveform can be obtained by changing the shape of the second slits or the shape of the second photoelectric conversion elements or the both. Also, due to the formation of the planar photoelectric conversion means by photoetching or the like, the mechanical positional accuracy can be improved with the resulting improved accuracy of rotor position detection and thus the electronic commutation function is performed with a high degree of accuracy. Since the second photoelectric conversion elements are not mounted on the stator coil base, the rotor position detecting elements have no danger of impeding the arrangement of the stator coils in motors of the type requiring a complicated coil arrangement as well as a reduction in size.

We claim:

1. An optical rotation detecting apparatus, comprising:
   a rotary shaft;
   a rotary disk fixed on said rotary shaft, and having a first slit group of n slits, n being an integer, disposed along a periphery thereof and a second slit group of m slits, m being an integer, disposed radially inwardly of said first slit group;

a light source facing one surface of said rotary disk for emitting light to all of the slits of said first slit group and a part of the slits of said second slit group; and a planar photoelectric conversion means facing another surface of said rotary disk, said photoelectric conversion means including an amorphous silicon film having a P-i-N junction and transparent electrodes dispersed on said amorphous silicon film which are supported on a same base, said transparent electrodes including first and second electrodes, said first electrodes comprising $n \times 2$ electrodes, the positions of said first and second electrodes corresponding to positions of the slits of said first slit group and said second slit group, respectively, and, said planar photoelectric conversion means further comprising a first conductive member connecting alternate ones of said first electrodes and a second conductive member connecting the remaining ones of said first electrodes.

2. An apparatus according to claim 1, wherein the second electrodes are arranged radially at a position corresponding to the radial position of the slits of said second slit group and have a width extending in a peripheral direction thereof, said width being smaller than a width of the slits of said second slit group extending in said peripheral direction.

3. An apparatus according to claim 1, wherein the first electrodes are arranged at a radial position corresponding to the radial position of the slits of said first slit group and said conductive member and said transparent electrodes are made of a same material.

4. An apparatus according to claim 1, wherein said first electrodes are arranged at a radial position corresponding to the radial position of the slits of said first slit group and said conductive member is made of a metallic opaque material.

5. An apparatus according to claim 1, wherein said first slit group comprises a plurality of slits arranged at equal pitches P along said periphery of said rotary disk centering around said rotary shaft, said photoelectric conversion means comprises (i) a plurality of first photoelectric conversion means each producing a first conversion signal and arranged along the entire said periphery of said rotary disk at intervals having a predetermined pitch which is an integral multiple of said pitch P so as to face said slits of said rotary disk on a side of said rotary disk opposite to a side thereof on which said light source is disposed and (ii) a plurality of second photoelectric conversion means each producing a second conversion signal and arranged along said periphery, each being spaced from one of said first photoelectric conversion means by a distance different from said predetermined pitch, said optical rotation detecting apparatus further comprising first means for generating a first rotation information signal having a frequency proportional to a rotational speed of said rotary shaft and acting as a first sum signal of said first conversion signals from said first photoelectric conversion means and second means for generating a second rotation information signal having a phase difference with respect to said first rotation information signal and acting as a second sum signal of said second conversion signals from said second photoelectric conversion means.

6. An apparatus according to claim 5, wherein the second electrodes are arranged radially at a position corresponding to the radial position of the slits of said second slit group and have a width extending in a peripheral direction thereof, said width being smaller than a width of the slits of said second slit group extending in said peripheral direction.

7. An apparatus according to claim 5, wherein the first electrodes are arranged at a radial position corresponding to the radial position of the slits of said first slit group and said conductive member and said transparent electrodes are made of a same material.

8. An apparatus according to claim 5, wherein said first electrodes are arranged at a radial position corresponding to the radial position of the slits of said first slit group and said conductive member is made of a metallic opaque material.

* * * * *